Figure 1:
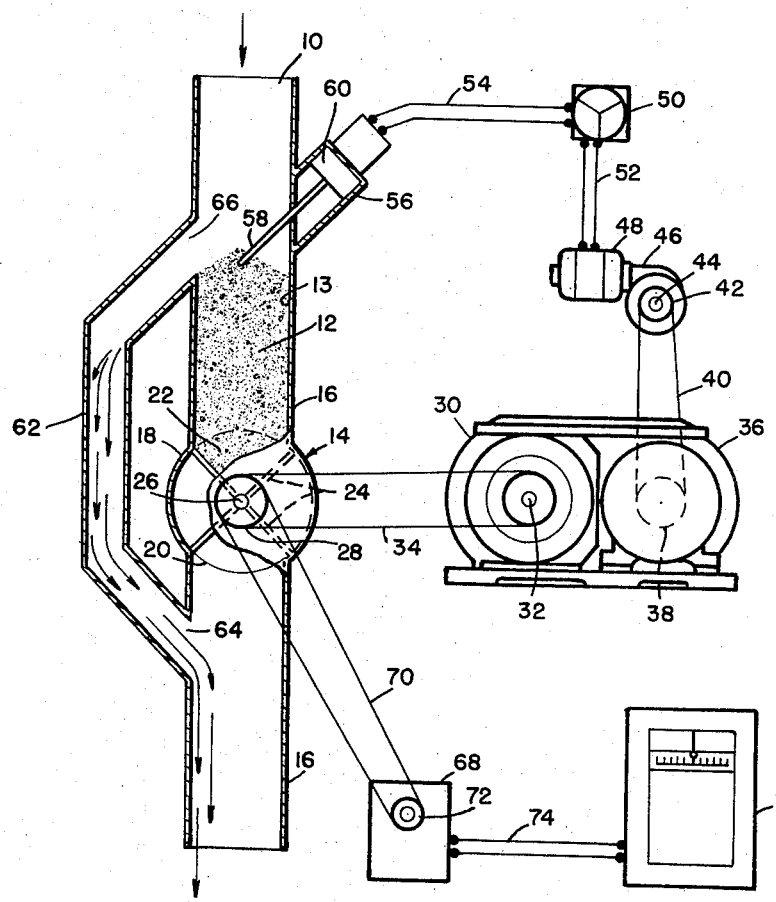

Nov. 24, 1959

R. MOEN 2,913,901

APPARATUS FOR MEASURING FLOW RATE

Filed June 27, 1952

INVENTOR
ROLF MOEN
BY William C. Strueber ATTORNEY

United States Patent Office 2,913,901
Patented Nov. 24, 1959

2,913,901

APPARATUS FOR MEASURING FLOW RATE

Rolf Moen, Minneapolis, Minn., assignor to General Mills, Inc., a corporation of Delaware Application June 27, 1952, Serial No. 295,978

6 Claims. (Cl. 73—218)

This invention relates to an apparatus for measuring the rate of flow of a free-flowing material through a conduit.

An object of the present invention is to provide a simple device for measuring the rate of flow of a dry free-flowing material, such as granulated or pulverulent material, grain, ground materials, etc., and which will accurately record and indicate the rate of flow of the material.

Another object of the invention is to provide a device for measuring the rate of flow of a free-flowing material which can be placed in any vertical material conducting conduit and which will accurately indicate the rate of flow.

Another object is to provide a flow meter which will handle sudden temporary increases in the rate of flow without clogging the line and will yield accurate indication of flow regardless of flow surges.

Other objects and advantages will become more apparent from the following specification and appended claims which, in combination with the drawings, contain a complete disclosure of the principles of my invention.

Figure 2:
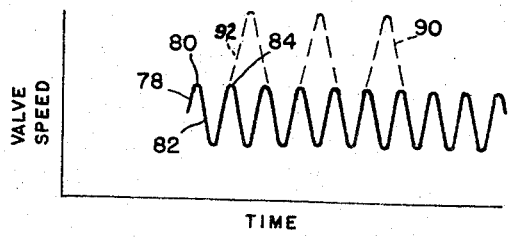
Figure 3:
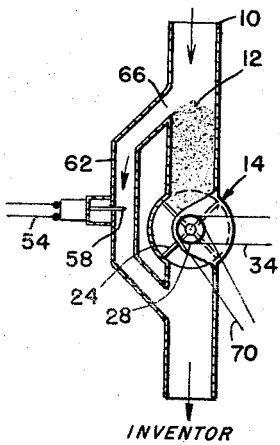

In the drawings:

Figure 1 is an elevational view, shown partially in schematic portrayal, with sections broken away for clarity and illustrating the flow measuring device; and Fig. 2 is a graphic representation of the speed of the metering device from which the rate of flow of material can be obtained; and Fig. 3 is an elevational view shown schematically to illustrate an alternative form of the mechanism embodying the invention.

The device shown in Fig. 1 illustrates a flow metering apparatus which may be incorporated into a vertical chute, conduit, pipe or the like for conducting free flowing material such as grain or similar granular or powdered material. The metering apparatus may be used as a self-contained unit and has open ends so that it may be installed in an existing chute to measure the flow of material.

The free-flowing material enters the upper end 10 of the vertical conduit, dropping down by gravity. The material 12 gathers in the chamber 13 formed by the portion of the conduit above the metering device 14. Although other types of metering devices may be used, the metering device 14, shown in the form of a rotary valve, is preferred because of its simplicity and because the amount of material passed through the valve is proportional to its rate of rotation. By metering device is meant an apparatus which will measure fixed amounts of material as it operates so that the amount passed is directly proportioned to the speed at which it is operated and the passage is controlled by the devices. Other mechanisms known to the art may be provided which will pass material at a rate proportional to their rate of operation, but the rotary valve is preferred because it is simple, accurate and requires little power to operate. All the material that passes through the main conduit 16 must pass through the rotary valve as it rotates and thus the speed of rotation will be an indication of the amount of material passed. When the amount of material passed is exactly equal to the amount of material flowing in the line or, in other words, entering into the opening 10, the speed of operation of the rotary valve will indicate the rate of flow of material.

The rotary valve may be of the conventional type having an enclosing casing 18 in which rotates the body of the valve 20, having a close clearance between it and the casing so that no material will pass except that which is carried through in the pockets 22 which are formed in the valve body. The pockets formed, as shown, are separated by walls 24. The valve body rotates on an axis 26 which carries a sprocket 28 for purposes of rotating the valve.

To drive the valve an electric drive motor 30 is provided and carries on its shaft a sprocket 32 which drives a chain 34 passing over the sprocket 28.

The driving motor 30 has associated therewith a speed control 36 which positively determines the speed at which the motor 30 is to operate. The speed control has a control wheel 38 which, when rotated in one direction, will increase the speed of the drive motor 30 and, when rotated in the opposite direction, will decrease the speed of the motor. The control wheel 38 in this instance is in the form of a sprocket driven by a chain 40 which is driven by a sprocket 42 carried on shaft 44 of a gear reduction 46 on the output shaft of control motor 48.

The motor 30 for driving the rotary valve is a motor of sufficient power to drive the valve with the speed control being of the electrical type to change the speed of the motor. The motor 48 also may be of any suitable type preferably one which meets the description of being a small fractional horsepower reversible motor, the motor 48 having the gear unit 46 associated therewith for speed reduction purposes. Both motors 30 and 48 may be of the type depicted on page 919 of The Standard Handbook for Electrical Engineers, 6th ed., 1933. The motor control 36 may be a rheostat operable in a manner described on page 642 of said Standard Handbook.

The motors 48 and 30 are furnished with a supply of operating electricity through suitable leads which are shown in part, the remaining leads being conventional and omitted for clarity of the drawings. The electricity supplied to the motor 48 is controlled by a relay switch 50 connected thereto through leads 52. When the relay 50 is in the energized position, the control motor will be made to operate in one direction and when the relay is in the unenergized position the control motor 48 will be made to operate in the reverse direction. The relay is energized by an electrical signal supplied through leads 54, the signal being produced in a flow responsive device 56 which is responsive to the level of the material within the conduit 16. The flow responsive mechanism 56 is of a type known to the art, having a needle 58 extending into the conduit to be struck by the material as it falls through the conduit. The needle is mounted in a base 60 which has a crystal and vibration of the needle 58 will generate an electric signal which is sent to actuate the relay. When the material 12 piles up in the chute, it covers the needle, the vibration ceases and the electrical signal is no longer produced. The absence of a signal causes the relay 50 to switch to the non-energized position.

The operation of the mechanism thus far described is as follows. With the material 12 piled up in the conduit 16 to the level shown in the drawing, the needle is covered and no electrical signal is generated. The rotary valve 14 operates continuously but is always increasing or decreasing in speed. When it operates at a discharge rate slower than the rate at which the material enters the chute at 10, the material will pile up. The relay 50 in the non-energized position will cause the control motor 48 to rotate in one direction which, for the present description of operation, shall be called the "forward direction." The control motor 48 through chain 40 rotates the sprocket 38 operating the speed control so that the motor 30 increases in speed at a constant rate. This increases the speed of the rotary valve and correspondingly increases the rate at which the material 12 is removed from the chamber 13. The control motor 48 continues to rotate in a forward direction and continues to increase the speed of the drive motor 30 at a uniform rate. This continues until the speed increases to where the material is taken away faster than the incoming flow and the needle 58 is bared and the material entering the conduit at 10 then strikes the needle causing it to vibrate. The signal generated by its vibration causes actuation of the relay switch 50 which reverses the control motor 48 to reverse the speed control wheel 38. This, of course, causes the rotary valve to begin to be slowed down at a constant rate. The material consequently is removed from the chamber 13 at a slower rate and again begins to build up to a point where the needle will be covered and the cycle will reoccur.

The function of the flow-responsive device 56, which is sensitive to the dropping of material, is to generate a signal indicating that the material in the chamber 13 has dropped below a certain predetermined amount. Although the device described is preferred because of its sensitivity, other mechanisms would be suitable which would be responsive to the amount of material present within the chamber 13 and which would operate to cause a change in direction of rotation of the control motor 48 when the material in the chamber either exceeds or is less than the predetermined amount.

In order to shorten the cycle of operation from slowing down to speeding up of the rotary valve, a by-pass conduit 62 is provided. The conduit 62 opens at its lower end into the main conduit 16 below the valve at 64 and the upper end opens into the main conduit at 66. The upper opening is positioned so that its lower edge is substantially even with the needle 58 so that the instant the needle 58 is completely covered and stops vibrating, the material will begin to flow through the by-pass.

If the by-pass were not provided the extra material which would build up above the needle would have to be removed by the rotary valve. With the by-pass, this material flows around the valve. This excess material results from the fact that by the time the needle 58 is covered, the rotary valve speed has slowed down to a degree where it is moving the material from the chamber 13 at a rate considerably less than the speed at which the material is entering at the upper end of the chamber through the opening 10. It takes a short period of time for the rotary valve, after it has begun to increase its rate of speed, to reach a speed where it removes the material from the chamber at a rate greater than that at which it enters. If it were not for the by-pass, by the time the rotary valve would have achieved a speed where it is capable of removing the material faster than the rate at which it is entering, additional material would have built up. This material would have piled up above the needle and the valve would have to remove this material before the level would drop down to a point where the needle is again uncovered. By this time, additional time would have elapsed and the speed of the valve would have increased to a point considerably beyond that which is required to remove the material at the rate at which it is entering. Then, as the needle is bared and the signal is generated to begin to slow down the valve, the material will continue to be removed from the chamber at a rate faster than at which it enters. This would be the condition until the control motor 48 has made sufficient revolutions to slow down the rotary valve. By this time the material will have been removed to where the level is a considerable distance below the needle. The rotary valve would, of course, still continue to slow down during the time the material is built up to where it covers the needle. Because the control motor 48 operates constantly the speed of drive motor and valve are constantly increasing or decreasing in speed.

Often the results of the above-described operation are a wide fluctuation between top speed and low speed of the rotary valve and "hunting" of the speed control mechanism occurs with less accurate measurement. Also the cycles get so large that small fluctuations in flow rate are not recorded. The provision of anticipating mechanisms would, of course, reduce the "hunting" but require more costly apparatus. With the provision of the by-pass 62, this wide-range "hunting" does not occur and the apparatus measures the rate of flow with a very small degree of error. Therefore, although the apparatus is operable without the by-pass equipment, it is preferable that it be provided to enhance the accuracy of the mechanism.

Since the rate of removal of the accumulated material 12 from the chamber 13 is proportional to the speed of the rotary valve 14, the rate of removal of material can be resolved from the speed of the valve. When the rate of removal equals the rate of entrance of the material, the rate of flow in the main conduit 16 will be determined. To record the speed of operation of the valve a speed indicating device, or tachometer 68, is attached and may be driven by running a chain 70 over the sprocket 28 or an additional sprocket attached beside it. The chain 70 drives a sprocket 72 on the tachometer and leads 74 connect the generating portion of the tachometer to a recorder or indicator 76 having a dial face. The recorder 76 can be utilized to record on a graph the record of the variance of the speed of the rotary valve.

Such a graph is shown in Fig. 2 with the horizontal axis representing time and the vertical axis representing the speed of the rotary valve. The solid lines of the graph indicate the recorded speed when the mechanism is used with the by-pass conduit 62, as is shown in Fig. 1. The inclined line 78, as the graph begins, indicates that the rotary valve is increasing in speed and at the node of the speed line 78 the change in speed of the valve has reversed from an increasing rate to a decreasing rate. The straight lines of the graph indicate that the rate of change in speed is uniform. The invention is not to be limited to use with mechanism which has a uniform decrease and increase cycle. Either the speed control 36 or the control motor 48 could be changed to give a varied speed change through the cycle.

Following the graph line 78 along its decline 82, the speed is decreasing and accordingly the material, being taken out of the chamber 13 at a lower rate, is building up to a point where it covers the needle 58. It must be borne in mind that while the speed is decreasing, the material is below the needle and, while the speed is increasing, the needle is covered. As soon as the needle is covered, it ceases to generate a signal and the reversal of the motor 48 immediately converts the change in speed from decreasing to increasing. The speed must increase until it can remove material faster than it enters and bare the needle. For the time it takes for the speed to increase to a point where the material is removed as fast as it enters the chamber 12, the excess material will flow off through the opening 66 through the by-pass chute. Very shortly, however, due to the increase in speed, the valve will remove the material faster than it enters and the needle will again be bared. Since the rotary valve must attain a speed to remove the material faster than it enters, the level of the material will drop some distance below the needle before the valve can be slowed up sufficiently to permit the material to build up to cover the needle. Since the valve must slow up to a point where the material enters faster than the valve removes it from the chamber, the needle will be covered for the time it takes for the valve to speed up sufficiently to again remove the material faster than it enters.

At the point indicated on the graph at 84, just past the node indicating the reversal in speed change from an increase in speed to a decrease, the material is removed at exactly the same speed at which it enters the chamber. Therefore the rate of removal exactly equals the rate of flow and at that point the discharge of the rotary valve records the exact rate of flow of material. At this stage no material is flowing through the by-pass and the quantity of material in the chamber above the meter is neither increasing nor decreasing. Thus, by taking any point on the graph just past the node of speed change, the rate of flow of material can be accurately determined. Actually, since the chart pattern is symmetrical any consistent series of points on the graph can be used to obtain a very accurate indication of the rate of flow by the use of the appropriate conversion factor. The nodes of the graphs, i.e., where the speed changes from increasing to decreasing give an accurate indication of material flow.

The dotted lines 90 in combination with portions of the solid lines indicate the approximate operation of the mechanism without the by-pass conduit 62. The extra length of inclined line 92 indicates the additional length of time the rotary valve speeds up due to the absence of the by-pass. This is caused by the valve's having to take care of the material which piles up above the sensitive needle 58. With the by-pass, this material flows past the valve. Because the valve must remove this extra material it attains a considerable speed before the needle is bared and, of course, it then takes longer to slow down the valve to again cover the needle. In actual operation, "hunting" may occur without the by-pass so that the speed will drop to zero before the material builds up to cover the valve. Although such a cycle is accurate for even flow it is less accurate than a cycle which is short.

It will be recognized that mechanism, other than the by-pass conduit 62, could be provided to remove the material which would accumulate above the needle. The conduit is preferred, however, because of its simplicity and effectiveness. The by-pass conduit is additionally effective where the flow through the main conduit is irregular and surges of material may occur. The by-pass, in cases of momentary surges of increased flow, prevents the material from jamming in the conduit and prevents the piling up of great quantities of material which would cause the rotary valve to attain a very high speed before it could take care of the heavy flow.

In Fig. 3 an alternative form of the invention is shown. The same basic flow arrangement is used with the main conduit 10 having the rotary valve 14 to pass the material as it piles it in the chamber 12 above the valve. The by-pass passageway 62 is provided to by-pass the material around the valve when it rises above the by-pass opening 66. The only difference in the structure is that the flow sensitive needle 58 is positioned in the by-pass conduit instead of in the main conduit 10. The operation of the device will be the same except when a signal is generated by material striking the needle 58, the switch and speed control motor 48 are so arranged that the motor will rotate in a direction to increase the speed of the rotary valve, thus increasing the rate at which the material is taken from the chamber 12. When the rotary valve of the mechanism of Fig. 3 is speeded up to a point where the material is being withdrawn from the chamber 12 at such a rate that it no longer flows through the by-pass conduit, the needle 58 will cease to generate a signal because the material no longer flows through the by-pass to strike it. At the cessation of the generated signal, the relay switch 50 and motor 48 are so connected as to cause the rotary valve to begin decreasing in speed. The absence of the signal from the needle of the mechanism in Fig. 3 has the reverse effect on the change of speed of the rotary valve from that of the needle of the mechanism of Fig. 1, wherein the cessation of a signal causes the valve to begin to speed up.

The sensitive needle mechanism of Fig. 3 may be of the same structure as that of Fig. 1 and may be any device which is responsive to the flow of material. Since the needle of Fig. 1 must cease generating a signal when partially covered and begin generating a signal when uncovered, it must be relatively sensitive to obtain a precise cut off point. In the mechanism of Fig. 3 the change of conditions when the material rises to the height of a by-pass opening has a more marked effect on the needle in that the material then begins to flow through the by-pass and strike the needle, having been completely absent from the proximity of the needle during the time the material is below the by-pass opening. Thus, in some instances the apparatus of Fig. 3 may utilize a less sensitive needle than that of Fig. 1, although each mechanism is particularly advantageous in certain conditions.

From the foregoing it will be seen that the mechanism for practicing my invention which I have outlined and described provides a simple but very efficient flow registering means. The device can be readily adapted to accommodate the flow of different types of materials and will, in the form shown and in other variations which are within the scope of the invention, accommodate a great variety of materials. The speed control and drive mechanism for operating the rotary valve are commercially available in standard units, thus reducing the cost of the flow measuring apparatus. The remainder of the mechanism may be constructed from standard apparatus. The conduit, by-pass valve, and associated mechanism can be easily assembled and, requiring little space, can be inserted into existing flow lines. The device has relatively few moving parts and is well adapted to handling grains and similar materials which are used in the manufacture of food as there are no recesses or crevices to harbor foreign materials or promote infestation.

I have, in the drawings and specification, presented a detailed disclosure of the preferred embodiments of my invention, but it is to be understood that the invention is susceptible of modifications, structural changes and various applications of use within the spirit and scope of the invention. The invention is, therefore, not to be limited to the specific form disclosed but I intend to cover all modifications, changes and alternative constructions and methods falling within the scope of the principles taught by my invention.

I claim as my invention:

1. A device for measuring the rate of flow of material comprising means forming a chamber having an inlet for receiving the flow of material and an outlet for discharging said material, a device for removing the material from the chamber via said outlet at a rate proportional to its speed of operation, a variable speed drive means operatively connected to said device for operating the material removing device, means responsive to the amount of material currently in the chamber and connected with the variable speed drive to increase the speed of said removing device when the amount of material in the chamber becomes greater than a predetermined amount and to decrease the speed if the material becomes less than said amount, a conduit means for by-passing material to one side of the chamber and past said removing device when the material becomes greater than said amount, and a speed indicator connected to said removing device for registering the speed of the removing device and thus indicating the rate of flow.

2. A device for measuring the rate of flow of material comprising a metering device positioned in a vertical main flow conduit to pass the material in an amount proportional to its speed of operation, a variable speed drive connected to said metering device, means responsive to the level of material accumulated above said metering device and connected to increase the speed of the variable speed drive as the material rises above a predetermined level and to decrease the speed as it drops below the level, a conduit opening into said main flow conduit above and below the metering device, the upper opening being substantially at said level so that material rising above said level will bypass the metering device, and means for indicating the speed of the metering device to indicate the rate of flow substantially at the point where the flow through the bypass ceases.

3. A device for measuring the rate of flow of material comprising a metering device positioned in a vertical chute for conducting a flow of material and operating to pass the material in an amount proportional to its speed, drive means connected to the metering device, a speed control attachment connected to said drive means which increases the rate of speed of said drive means when operated in one direction and decreases the rate thereof when operated in the opposite direction, a reversible motor operably attached to said speed control attachment to cause it to increase the speed of the drive means when operating in one direction and to decrease the speed thereof when operating in the other direction, means responsive to the level of the material positioned above said metering device and connected to operate the motor in a direction to increase the speed of the metering device when the material rises above the level of said responsive means and operate the motor in an opposite direction to decrease the speed of the metering device when the level falls below said responsive means, a bypass chute opening into the main shaft above and below the metering device, the upper opening being substantially at the position of said responsive means so that material rising above that level will flow through said by-pass chute past the metering device, and a speed indicating element driven by said metering device for indicating the speed of the metering device and thereby record the rate of flow of material.

4. A device for measuring the rate of flow of material comprising a rotary valve positioned in a vertical pipe for conducting material and passing the material in an amount proportional to its speed of operation, a variable speed drive connected to the rotary valve, speed control mechanism operating upon the receipt of a signal to decrease the speed of said drive and upon the absence of said signal to increase the speed of the drive, an element positioned in the pipe above the rotary valve and generating a signal to be furnished to said speed control mechanism when the flowing material is striking the element and not generating the signal when the material accumulates to cover said element, a by-pass pipe arranged to conduct material around said rotary valve and having one end opening into the main pipe substantially at the position of said element so that material accumulating above the element will be conducted past the rotary valve, and a device drivenly connected to said rotary valve for indicating the speed of the rotary valve to thereby indicate the rate of flow.

5. A device for measuring the rate of flow of granular material comprising substantially vertical conduit means including a pair of parallel portions, one of said portions constituting a main portion and the other a by-pass portion, a rotary valve located in said main portion and through which all of the granular material must pass until a sufficient quantity has built up so as to rise to the entrance to said by-pass portion, said main portion being in alignment with the generally vertical axis of the conduit means and said by-pass portion being offset therefrom, driving means mechanically connected to said rotary valve, control means for varying the speed of said driving means and hence the speed of said rotary valve, said control means including a flow detector disposed in one of said parallel portions, whereby said driving means will be controlled in accordance with flow conditions existing in said one parallel portion, and flow indicating means connected to said rotary valve for indicating the rate of flow of granular material through said rotary valve.

6. A device for measuring the rate of flow of granular material comprising a substantially vertical conduit, release means positioned in said conduit to release the material therefrom at a rate proportional to its speed of operation, a by-pass conduit leading from a locus above said release means to a locus below said release means, driving means mechanically connected to said release means, control means for varying the speed of said driving means and hence the speed of said release means, said control means including a flow detector mounted in said conduit adjacent to said by-pass conduit, whereby said driving means will be controlled in accordance with the flow conditions existing in the region of said by-pass conduit, and flow indicating means connected to said release means for indicating the rate of flow of granular material through said mechanism.

References Cited in the file of this patent

UNITED STATES PATENTS

| | | |
|---|---|---|
| 40,485 | Johnson | Nov. 3, 1863 |
| 360,071 | Wheeler | Mar. 29, 1887 |
| 1,307,337 | Bassett | June 24, 1919 |
| 1,372,768 | Mott | Mar. 29, 1921 |
| 1,820,981 | Le Fever | Sept. 1, 1931 |
| 1,890,078 | Enochs et al. | Dec. 6, 1932 |
| 2,042,725 | Montelius | June 2, 1936 |
| 2,314,421 | Peterson | Mar. 23, 1943 |
| 2,529,481 | Brewer | Nov. 14, 1950 |
| 2,552,454 | Pitcher et al. | May 8, 1951 |
| 2,621,516 | Zavoico | Dec. 16, 1952 |
| 2,658,644 | Lowe | Nov. 10, 1953 |
| 2,668,097 | Hallikainen | Feb. 2, 1954 |
| 2,687,817 | Browne | Aug. 31, 1954 |